United States Patent
Tan et al.

(10) Patent No.: US 8,451,578 B1
(45) Date of Patent: May 28, 2013

(54) HARD DRIVE PARTICLE CLEANING SYSTEM AND METHOD

(75) Inventors: Huynh P. Tan, San Jose, CA (US); Rudy C. Boynton, San Jose, CA (US); Paul H. Henry, San Jose, CA (US)

(73) Assignee: Western Digital Technologies, Inc., Irvine, CA (US)

(*) Notice: Subject to any disclaimer, the term of this patent is extended or adjusted under 35 U.S.C. 154(b) by 620 days.

(21) Appl. No.: 12/705,520

(22) Filed: Feb. 12, 2010

(51) Int. Cl.
*H01T 23/00* (2006.01)

(52) U.S. Cl.
USPC .......................................... 361/230

(58) Field of Classification Search
USPC .......................................... 361/230
See application file for complete search history.

(56) References Cited

U.S. PATENT DOCUMENTS

| | | | |
|---|---|---|---|
| 4,689,715 A | 8/1987 | Halleck | |
| 4,751,759 A | 6/1988 | Zoell | |
| 4,883,542 A | 11/1989 | Voneiff | |
| 5,125,124 A | 6/1992 | Saeki et al. | |
| 5,265,298 A | 11/1993 | Young | |
| 5,315,793 A | 5/1994 | Peterson et al. | |
| 5,920,954 A | 7/1999 | Sepponen | |
| 5,989,355 A * | 11/1999 | Brandt et al. | 134/6 |
| 5,991,965 A | 11/1999 | Stroh et al. | |
| 6,137,670 A * | 10/2000 | West et al. | 361/213 |
| 6,205,676 B1 | 3/2001 | Fujii et al. | |
| 6,228,149 B1 | 5/2001 | Alenichev et al. | |
| 6,474,355 B1 | 11/2002 | Jirawat et al. | |
| 6,506,232 B2 | 1/2003 | Menear | |
| 6,553,807 B2 | 4/2003 | Luk et al. | |
| 6,740,893 B1 | 5/2004 | Tanabe | |
| 6,902,630 B2 | 6/2005 | Ernst et al. | |
| 6,962,620 B2 | 11/2005 | Chang et al. | |
| 7,111,797 B2 | 9/2006 | Bezama et al. | |
| 7,297,286 B2 | 11/2007 | Tannous et al. | |
| 7,442,112 B2 | 10/2008 | Yoon | |
| 7,673,638 B1 | 3/2010 | Boynton et al. | |
| 7,695,552 B2 * | 4/2010 | Sato et al. | 96/83 |
| 8,312,617 B2 * | 11/2012 | Omura et al. | 29/603.03 |
| 2006/0221536 A1 | 10/2006 | Goto | |

* cited by examiner

Primary Examiner — Stephen W Jackson

(57) ABSTRACT

A hard drive particle cleaning system includes an air source, an ionizer module coupled to the air source via upstream tubing, a mechanical shock system configured to secure a hard drive and apply a mechanical shock to the hard drive to dislodge particles inside the hard drive, and an exhaust system. The ionizer module includes a shell and an inlet nozzle arranged in a first end of the shell and coupled to the upstream tubing for supplying a stream of air from the air source into the shell.

20 Claims, 4 Drawing Sheets

HARD DRIVE PARTICLE CLEANING SYSTEM AND METHOD

FIELD

The present disclosure generally concerns the manufacture of hard drives and, more particularly, a hard drive particle cleaning system and method.

BACKGROUND

Hard drives read and write data to a magnetic disk by positioning a magnetic recording head over the magnetic disk as it is rotated by a motor. The magnetic recording head is supported over the surface of the magnetic disk by an air bearing created by the rotation of the magnetic disk. The distance separating the magnetic recording head from the surface of the magnetic disk during operation of the hard drive generally is less than a micron. Particles present on the surface of the disk may cause damage to the magnetic recording head or the magnetic disk and correspondingly may cause the loss of data stored on the magnetic disk.

In order to reduce the occurrence of loose particles, hard drives typically are manufactured and assembled in cleanroom environments. Even in cleanroom environments, however, particles can be generated within a hard drive when drive components come in contact with one another or with tools during the assembly process. Hard drive reliability can be improved by removing as many loose particles as possible from within an assembled hard drive during the final stages of assembly.

SUMMARY

The subject technology uses a combination of an ionized stream of air and a mechanical shock to dislodge and exhaust loose particles from within a hard drive. The ionized stream of air is generated to create a relatively equal number positively charged ions and negatively charged ions. These ions are used to neutralize attractive electrostatic forces that may hold particles in place within the hard drive and allow the particles to become dislodged and exhausted from the hard drive.

According to one aspect of the present disclosure, an ionizer module for ionizing a stream of air in a hard drive particle cleaning system is described. The ionizer module includes a shell and an inlet nozzle arranged in a first end of the shell and configured to be coupled to upstream tubing for supplying a stream of air into the shell. An emitter ring is mounted on an inner surface of the shell and includes emitter points positioned along an inner surface of the emitter ring. The emitter ring is configured to be coupled to a power source for ionizing the stream of air in the shell. A diffuser is arranged on the inner surface of the shell between the first end of the shell and the emitter ring. The diffuser is configured to provide an even flow of the stream of air across the emitter points. An outlet nozzle is arranged in a second end of the shell opposite the first end of the shell and is configured to be coupled to downstream tubing for supplying the ionized stream of air into a hard drive.

According to another aspect of the present disclosure, a hard drive particle cleaning system is described. The hard drive particle cleaning system includes an air source, an ionizer module coupled to the air source via upstream tubing, a mechanical shock system configured to secure a hard drive and apply a mechanical shock to the hard drive to dislodge particles inside the hard drive, and an exhaust system. The ionizer module includes a shell and an inlet nozzle arranged in a first end of the shell and coupled to the upstream tubing for supplying a stream of air from the air source into the shell. An emitter ring is mounted on an inner surface of the shell. The emitter ring includes emitter points positioned along an inner surface of the emitter ring and is configured to be coupled to a power source for ionizing the stream of air in the shell. A diffuser is arranged on the inner surface of the shell between the first end of the shell and the emitter ring, and is configured to provide an even flow of the stream of air across the plurality of emitter points. An outlet nozzle is arranged in a second end of the shell opposite the first end of the shell and is coupled to downstream tubing. The downstream tubing is configured to be detachably coupled to a first opening in the hard drive for supplying the ionized stream of air into the hard drive and the exhaust system is configured to be detachably coupled to a second opening in the hard drive for exhausting the ionized stream of air and dislodged particles from inside the hard drive.

According to another aspect of the present disclosure, a method for dislodging and removing particles from a hard drive is described. The method includes securing a hard drive to a mechanical shock system, coupling an ionizer module to a first opening of the hard drive via downstream tubing, and coupling an exhaust system to a second opening of the hard drive. The method further includes supplying an ionized stream of air from the ionizer module into the hard drive via the downstream tubing and applying a mechanical shock to the hard drive with the mechanical shock system to dislodge particles inside the hard drive. The ionized stream of air and dislodged particles are exhausted from inside the hard drive via the exhaust system.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components have been simplified or omitted from the figures to avoid obscuring the concepts of the subject technology.

Figure 1:
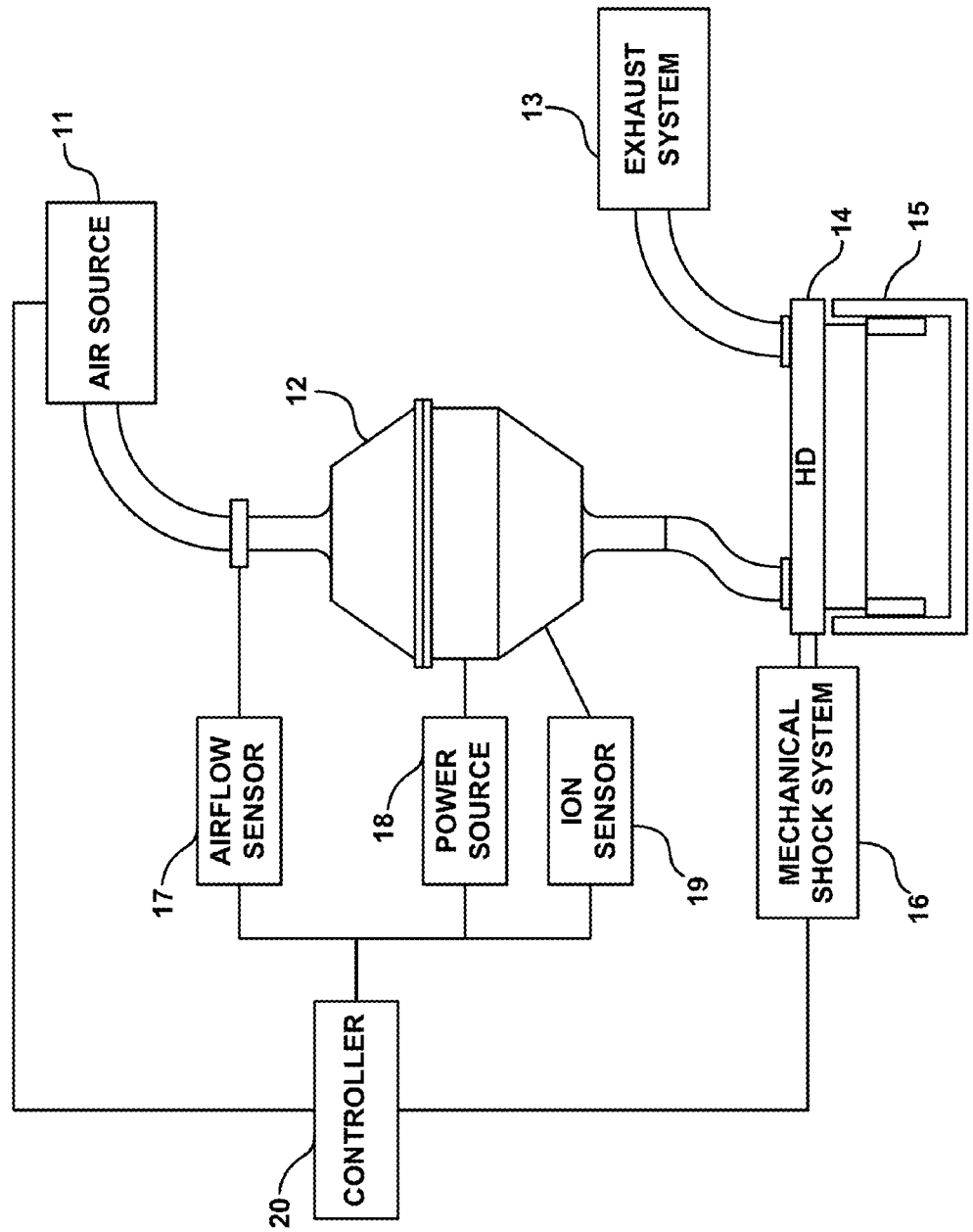
FIG. 1 is a block diagram depicting components of a hard drive particle cleaning system according to one aspect of the subject technology.

FIG. 1 is a block diagram depicting components of a hard drive particle cleaning system according to one aspect of the subject technology. As depicted in FIG. 1, hard drive particle cleaning system 10 includes air source 11, ionizer module 12, and exhaust system 13, which are configured to pass an ionized stream of air through hard drive (HD) 14. HD 14 may be delivered to and positioned within cleaning system 10 via conveyor system 15. Mechanical shock system 16 is arranged to apply a mechanical shock to HD 14 as the ionized stream of air passes through HD 14 to dislodge and exhaust particles from within HD 14. Airflow sensor 17 monitors the airflow being provided by air source 11, power source 18 supplies power to ionizer module 12, and ion sensor 19 monitors the ionic rate of the ionized stream of air. Finally, controller 20 monitors and controls the operation of cleaning system 10. A more detailed description of the components of cleaning system 10 is provided below.

Air source 11 is configured to supply a pressurized stream of air into ionizer module 12. The pressure at which the stream of air is supplied by air source 11 is selected to provide sufficient airflow to flush particles out of HD 14 but not damage the interior components of HD 14. For example, air source 11 may be configured to supply the stream of air at a pressure of 1 psi. Those skilled in the art will recognize that the subject technology is not limited to this amount of pressure and that the supplied pressure may be greater or less than 1 psi.

Air source 11 may include one or more filters to remove particles from the stream of air before it is supplied to ionizer module 12 and subsequently into HD 14. As noted above, hard drives typically are manufactured in a cleanroom environment. The one or more filters may provide a level of filtration at least to the level specified for the manufacturing cleanroom environment. In addition, air source 11 may include a de-humidifier to remove moisture from the stream of air.

Air source 11 is intended to represent any system known to those skilled in the art to be capable of providing the foregoing functionality. For example, air source 11 may comprise one or more pressurized containers that are filled with clean, dry air off-site and delivered to the manufacturing cleanroom facility. Alternatively, air source 11 may comprise one or more compressor systems operable to pressurize and deliver air at the desired pressure level.

As noted above, the stream of air passes through HD 14 to remove loose particles from within HD 14 as mechanical shock system 16 applies a mechanical shock to HD 14 to dislodge the particles. The ease with which particles can be dislodged by the mechanical shock and exhausted by the stream of air varies depending on the geometry and size of the particles. For example, a particle with a large surface area but small area of contact with a component within HD 14 is more easily dislodged and exhausted than a particle having a smaller surface area but larger area of contact with the component. In addition, the material of the particles may create difficulties in dislodging and exhausting the particles from HD 14. For example, non-metallic particles may rub against a resting surface during the mechanical shock and tribo-charge producing an electrostatic charge and attraction between the particle and the resting surface. To neutralize these electrostatic charges, the stream of air is ionized prior to being supplied to HD 14. The ions within the stream of air combine with and neutralize the electrostatic charges on the particles to allow them to more easily be removed from within HD 14.

Figure 2:
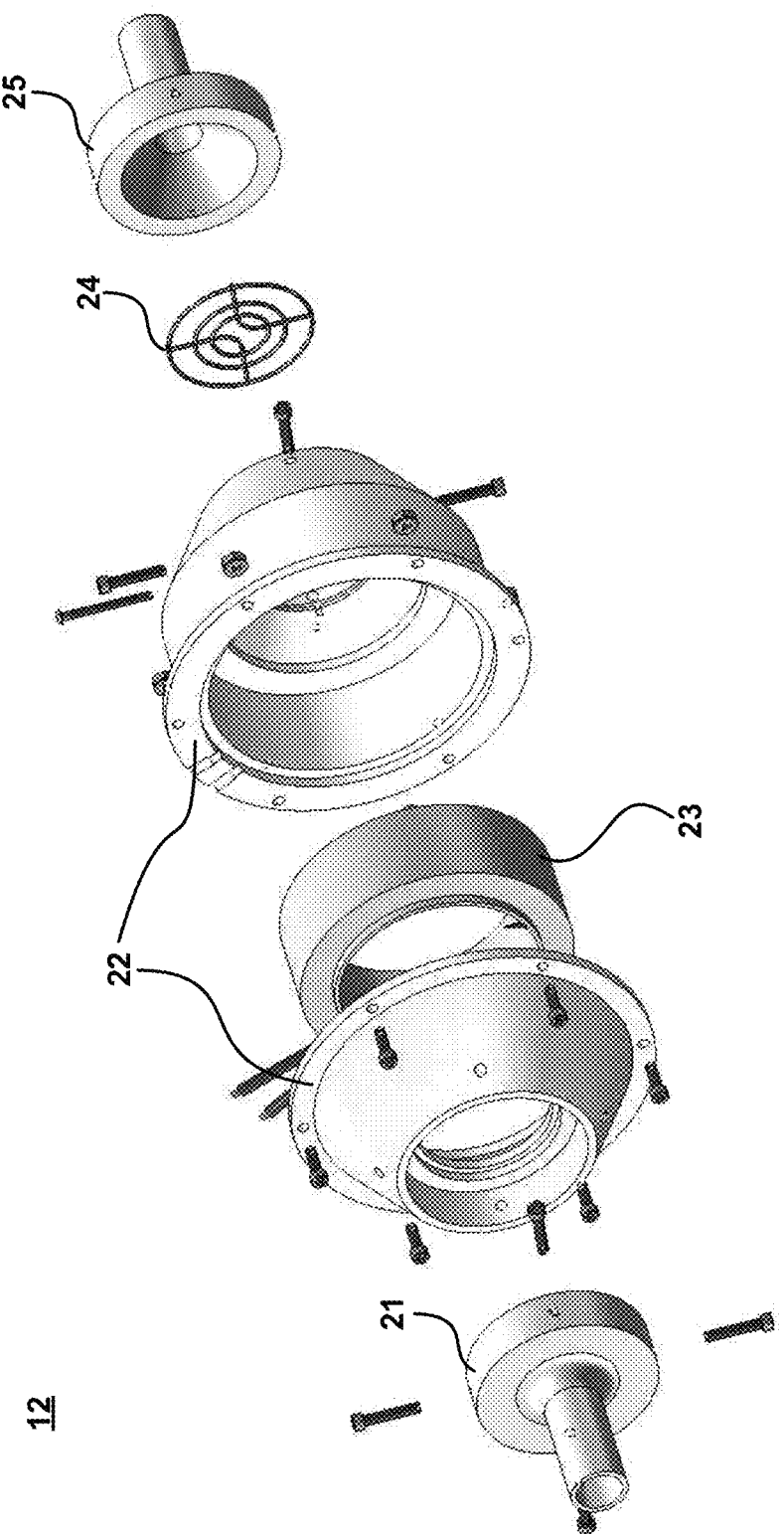
FIG. 2 is an exploded view of an ionizer module according to one aspect of the subject technology.

Ionizer module 12 is coupled to air source 11 and is configured to ionize the stream of air as it passes through ionizer module 12. FIG. 2 is an exploded view of components of ionizer module 12 according to one aspect of the subject technology. As depicted in FIG. 2, ionizer module 12 includes inlet nozzle 21, shell 22, emitter ring 23, metal grid 24, and outlet nozzle 25. Briefly, inlet nozzle 21 is configured to be coupled to upstream tubing for receiving the pressurized stream of air from air source 11 into shell 22. As the stream of air passes through shell 22, emitter ring 23 ionizes the stream of air, which exits shell 22 via outlet nozzle 25. Outlet nozzle 25 is configured to be coupled to downstream tubing for supplying the ionized stream of air into HD 14. The operation of ionizer module 12 will now be described in more detail with reference to FIG. 3.

Figure 3:
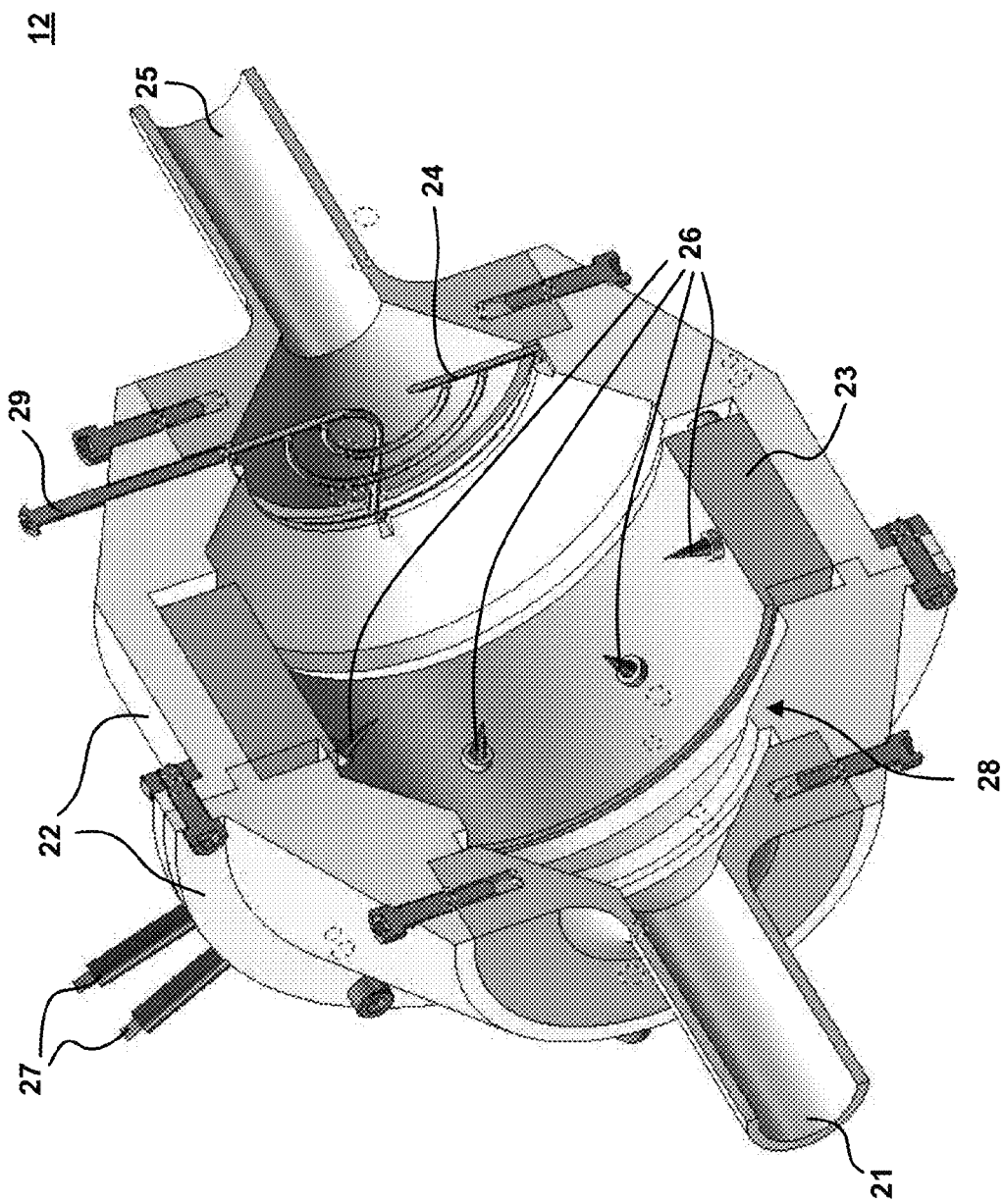
FIG. 3 is a cross-sectional view of an ionizer module according to one aspect of the subject technology.

FIG. 3 is a cross-sectional view of ionizer module 12 according to one aspect of the subject technology. As depicted in FIG. 3, emitter ring 23 is mounted on an inner surface of shell 22 so that the stream of air passes through the center of emitter ring 23 as it flows through ionizer module 12. Multiple emitter points 26 are evenly positioned along an inner surface of emitter ring 23 and are electrically coupled to leads 27. Power source 18, shown in FIG. 1, is configured to be coupled to leads 27 to apply a voltage to emitter points 26. As a voltage is applied to emitter points 26, the stream of air flowing through ionizer module 12 is ionized as it flows over emitter points 26.

According to one aspect of the subject technology, an even number of emitter points 26 are positioned along the inner surface of emitter ring 23. Power source 18 may be configured to supply a positive voltage to half of emitter points 26 and a negative voltage to the other half of emitter points 26 via leads 27, where the positive and negative emitter points are positioned in an alternating arrangement along the inner surface of emitter ring 23. For example, a total of eight emitter points 26 may be positioned along the inner surface of emitter ring 23, with four of the emitter points being coupled to one of the two leads 27 for supplying a negative voltage from power source 18 and the other four emitter points being coupled to the other one of the two leads 27 for supplying a positive voltage from power source 18. The subject technology is not limited to eight emitter points 26 and may be implemented with more or less than eight emitter points.

The voltage level supplied by power source 18 is selected to ionize the stream of air without arcing between emitter points 26, which could introduce additional particles into the stream of air. The selected voltage will vary depending on the spacing and dimensions of emitters points 26. For example, power source 18 may supply between 100 V and 1400 V to emitter points 26. A single power source 18 may supply both the positive and negative voltages to emitter points 26. Alternatively, two power sources may be used to supply the positive and negative voltages, respectively. Furthermore, the negative and positive voltages applied may not be equal in value. For example, a positive 100 V may be applied to the positive emitter points and a negative 150 V may be applied to the negative emitter points.

Emitter ring 23 may be made of an insulative material having a high dielectric constant, such as poly carbonate or any of a number of polymers known to those skilled in the art. Emitter points 26 may be made of a durable conductive material including, but not limited to, titanium, stainless steel, and tungsten. According to one aspect of the subject technology, emitter points 26 are between 6 and 7 mm long and are tapered to a point from a base having a diameter of 3 mm. Those skilled in the art will recognize that emitter points having dimensions varying from these may be used without departing from the scope of the subject technology. Emitter points 26 are arranged to point radially inward from the inner surface of emitter ring 23 and are evenly spaced along the inner surface of emitter ring 23 in an alternating manner. Accordingly, each negative emitter point has a positive emitter point positioned adjacently on either side and vice versa. To provide an even flow of air over emitter points 26, a diffuser 28 is formed on the inner surface of shell 22 between inlet nozzle 21 and emitter ring 23. This even flow of air helps cool emitter points 26 and keeps the generated ions flowing through ionizer module 12.

According to one aspect of the subject technology, the upstream tubing used to couple ionizer module 12 to air source 11 is static dissipative tubing. Static dissipative tubing is used to avoid charges building up in the stream of air prior to reaching ionizer module 12. On the other hand, the downstream tubing used to supply the ionized stream of air into HD 14 is insulative tubing. The insulative tubing is used to minimize the amount of positive and negative ions combining and thereby neutralizing prior to reaching HD 14. In addition, inlet nozzle 21, shell 22, and outlet nozzle 25 may be made of insulative materials such as plastics. These plastics may be cleanroom safe plastics that are non-outgassing.

Various monitoring and safety mechanisms may be employed in cleaning system 10. For example, airflow sensor 17, as shown in FIG. 1, may be positioned between air source 11 and ionizer module 12 to monitor the flow of pressurized air being supplied to ionizer module 12. If the flow of pressurized air drops too low, emitter points 26 may overheat and create a fire hazard. Accordingly, if airflow sensor 17 detects that the flow of pressurized air drops below a threshold, an alarm may be sounded to alert an operator of a dangerously low airflow. Alternatively, power source 18 may be controlled to stop supplying power to emitter points 26 when the detected airflow drops below the threshold. The threshold for dangerously low airflow may be set at 1 standard cubic foot per minute. However, those skilled in the art will recognize that this threshold may vary from this value depending on size and specifications of cleaning system 10. The subject technology is not limited to any particular type of airflow sensor and any of a number of airflow sensors known to those skilled in the art may be used without departing from the scope of the subject technology.

In addition to the flow of air being supplied to ionizer module 12, the ionic rate of the ionized stream of air being supplied by ionizer module 12 may be monitored. Specifically, the ionized stream of air may be monitored to determine if the number of positive ions is relatively balanced with the number of negative ions being generated by ionizer module 12. To monitor the ionic rate, metal grid 24 is arranged within shell 22 between emitter ring 23 and outlet nozzle 25. As the ionized stream of air passes though metal grid 24, the electrical potential on metal grid 24 will vary depending on the relative number of positive ions and negative ions present in the stream of air. For example, if there are more positive ions generated than negative ions, a positive electrical potential may build on metal grid 24. Correspondingly, if there are more negative ions generated than positive ions in the stream of air, a negative potential may build on metal grid 24.

The electrical potential of metal grid 24 is monitored by ion sensor 19, shown in FIG. 1. Specifically, ion sensor 19 measures the electrical potential of metal grid 24 via lead 29, which is in electrical contact with metal grid 24. If the electrical potential of metal grid 24 measured by ion sensor 19 exceeds a threshold, an alarm may sound to alert an operator that the ionic rate of the ionized stream of air is imbalanced, or power source 18 may be controlled to stop supplying power to emitter points 26. For example, if the measured electrical potential of metal grid 24 exceeds +/−3 V, the alarm will sound or the supplied power will be cut. Those skilled in the art will recognize that this threshold may vary from +/−3 V without departing from the scope of the subject technology. The subject technology is not limited to any particular type of meter for measuring the electrical potential of metal grid 24 and any of a number of meters known to those skilled in the art may be used.

As indicated above, ionizer module 12 supplies an ionized stream of air into a first opening of HD 14. After the ionized stream of air passes through HD 14, it is exhausted, along with the dislodged particles, through a second opening of HD 14 into exhaust system 13. Exhaust system 13 may trap the exhausted particles as wasted using one or more filters. Exhaust system 13 may rely on the air pressure supplied by air source 11 to exhaust and trap the dislodged particles, or exhaust system 13 may apply a vacuum to assist in removing the dislodged particles from within HD 14.

Ionizer module 12 and exhaust system 13 are configured to be detachably coupled to a first opening and a second opening, respectively, of HD 14. The openings of HD 14 are selected to form a path through HD 14 for the ionized stream of air to exhaust particles from within HD 14. The coupling between HD 14 and ionizer module 12 and exhaust system 13 may be achieved using a seal arranged on the end of tubing connecting each of ionizer module 12 and exhaust system 13 to the respective openings in HD 14. The seal may rely on physical pressure to prevent the stream of air from escaping into the manufacturing environment. Other techniques known to those skilled in the art may be used to maintain the connection to the openings in HD 14 without departing from the scope of the subject technology.

As further indicated above, mechanical shock system 16 applies a mechanical shock to HD 14 as the stream of ionized air is supplied into HD 14. The use of a mechanical shock to dislodge particles within a hard drive is known to those skilled in the art and will not be described in further detail herein. HD 14 may be positioned via conveyor system 15 within cleaning system 10 to be detachably coupled to ionizer module 12 and exhaust system 13 and receive a mechanical shock from mechanical shock system 16. Conveyor systems used to move a workpiece from work station to work station are well known in the manufacturing industry. Typically, conveyor systems rely on a series of belts or rollers within a track and a drive mechanism to shuttle a workpiece, such as HD 14, between work stations for different stages of a manufacturing process. HD 14 may be mounted on a platform that engages with conveyor system 15 to facilitate the transport and positioning of HD 14 within cleaning system 10.

Conveyor system 15 allows multiple hard drives to be sequentially positioned within cleaning system 10 and purged of particles using the combination of the mechanical shock and the ionized stream of air. Alternatively, each hard drive may be individually positioned within cleaning system 10 by an operator or an automated robotic system without departing from the scope of the subject technology.

While the components of cleaning system 10 described above may be monitored and operated by an operator to dislodge and remove particles from a hard drive, cleaning system 10 may include controller 20 configured to monitor and control the operation of the components. As represented in FIG. 1, controller 20 is connected to air source 11, airflow sensor 17, power source 18, ion sensor 19, and mechanical shock system 16. Although not represented in FIG. 1, controller 20 also may be connected to exhaust system 13 and conveyor system 15. Controller 20 may communicate data and commands between each of the components of cleaning system 10 to implement the functionality described above. For example, controller 20 may control the supply of the stream of air via air source 11, the power supplied to emitter points 26 in ionizer module 16 via power source 18, and the delivery of the mechanical shock to HD 14 via mechanical shock system 16. In addition, controller 20 may monitor the airflow measured by airflow sensor 17 and the ionic rate of the stream of air measured by ion sensor 19 and control the other components as described above.

Controller 20 may be implemented using a processor configured to execute code stored on machine readable media. The processor may be a microprocessor, an ASIC, an FPGA, etc. The machine readable media may include electronic media such as DRAM, SRAM, Flash memory, EEPROM, etc., magnetic media such as a hard drive, a floppy disk, magnetic tape, etc., and/or optical media such as CD-ROM, DVD, etc. Controller 20 may communicate data and commands with the components of cleaning system 10 using one or more communication buses and/or wireless links. Controller 20 may include a user interface to allow an operator to monitor the operation of cleaning system 10 and the individual components therein as well accept user input from an operator to control operation of the individual components of cleaning system 10 and/or enter the various parameters discussed above used to monitor cleaning system 10. Controller 20 may be used to implement a state machine used to monitor airflow and ionic rate of the stream of air during operation of cleaning system 10. Controller 20 also may be used to control the overall operation of cleaning system 10 to automate a process for dislodging and removing particles from a hard drive.

Figure 4:
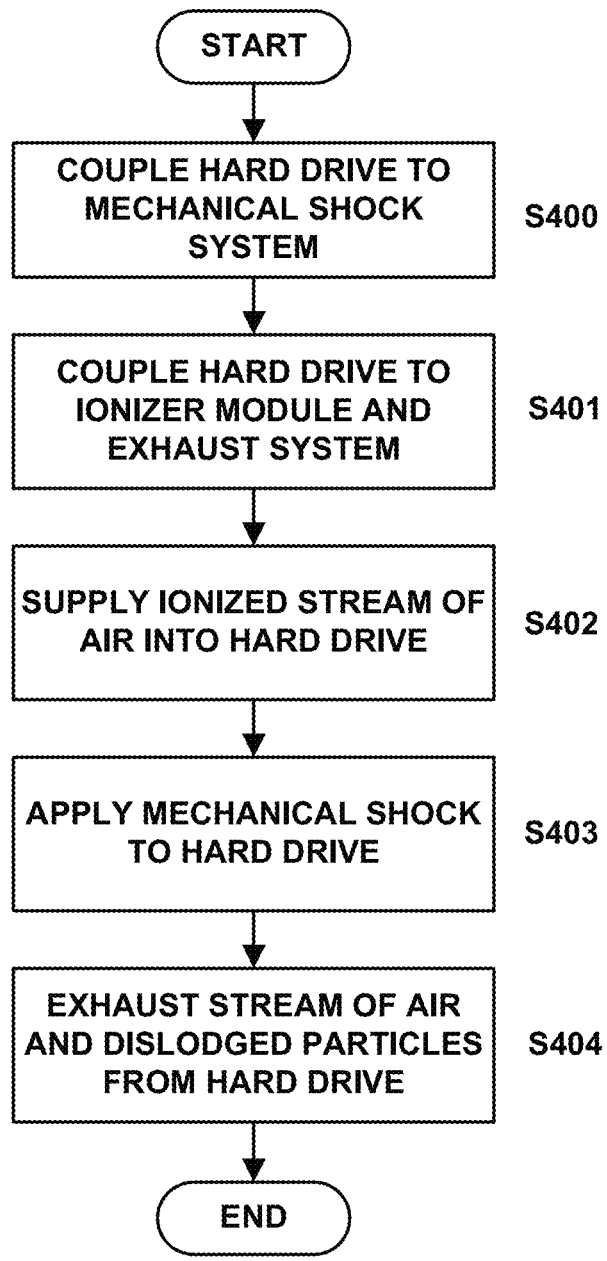
FIG. 4 is a flowchart illustrating a method form dislodging and removing particles from a hard drive according to one aspect of the subject technology.

FIG. 4 is a flowchart illustrating steps of a method for dislodging and removing particles from a hard drive according to one aspect of the subject technology. The method may be implemented by controller 20 executing code containing one or more sequences of instructions to control the components of cleaning system 10 to perform the method steps. Alternatively, one or more of the method steps may involve action by an operator. Briefly, a hard drive is positioned and detachably coupled to mechanical shock system 16, ionizer module 12, and exhaust system 13, an ionized air stream is supplied into the hard drive while a mechanical shock is applied to the hard drive. Finally, the stream of air and loose particles are exhausted from within the hard drive. Each of the steps represented in FIG. 4 is discussed in further detail below.

In step S400, a hard drive is coupled to mechanical shock system 16 in preparation for dislodging and removing particles from within the hard drive. The hard drive is coupled to mechanic shock system 16 by being positioned adjacent a ram used by mechanical shock system 16 to apply a physical shock to the hard drive. The positioning of the hard drive may be performed manually by an operator or may be automatically performed using conveyor system 15.

In step S401, ionizer module 12 is detachably coupled to a first opening in the hard drive and exhaust system 13 is detachably coupled to a second opening in the hard drive. Similar to the coupling to mechanical shock system 16, this may be performed manually by an operator or automatically using automated machinery well known to those skilled in the art. It is noted that step S401 may be performed prior to step S400 or simultaneously with step S400.

In step S402, an ionized stream of air is supplied into the hard drive. As discussed above, power source 18 applies voltages to emitter points 26 within ionizer module 12 while air source 11 supplies a pressurized stream of air into ionizer module 12. As the stream of air flows over emitter points 26, ions are generated within the stream of air. During this step, the airflow of the stream of air and the ionic rate of the ionized stream of air may be monitored and controlled in the manner described above.

In step S403, mechanical shock system 16 applies one or more mechanical shocks to the hard drive by accelerating the ram into contact with the hard drive. The quick acceleration of the ram and contact with the hard drive causes loose particles within the hard drive to dislodge. The ionized stream of air neutralizes electrostatic charges that may have formed on the particles and exhausts the particles from within the hard drive.

In step S404, the dislodged particles and stream of air are exhausted into exhaust system 13. As noted above, exhaust system 13 may passively trap the particles using one or more filters as the stream of air moves through exhaust system 13, or exhaust system 13 may apply a vacuum to assist in exhausting the dislodged particles.

As discussed above, the subject technology provides an innovative hard drive particle cleaning system for dislodging and removing particles within a hard drive during the manufacturing process. Ionizing a stream of air with both positively charged ions and negatively charged ions allows the stream of air to not only be used to flush out particles but also to neutralize electrostatic forces that may have been created on the particles. Once the electrostatic forces have been neutralized, the particles are more easily flushed out with the stream of air.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An ionizer module for ionizing a stream of air in a hard drive particle cleaning system, the ionizer module comprising:
    a shell;
    an inlet nozzle arranged in a first end of the shell and configured to be coupled to upstream tubing for supplying a stream of air into the shell;
    an emitter ring mounted on an inner surface of the shell, the emitter ring comprising a plurality of emitter points positioned along an inner surface of the emitter ring, wherein the emitter ring is configured to be coupled to a power source for ionizing the stream of air in the shell;
    a diffuser arranged on the inner surface of the shell between the first end of the shell and the emitter ring, wherein the diffuser is configured to provide an even flow of the stream of air across the plurality of emitter points; and
    an outlet nozzle arranged in a second end of the shell opposite the first end of the shell and configured to be coupled to downstream tubing for supplying the ionized stream of air into a hard drive.

2. The ionizer module according to claim 1, wherein the plurality of emitter points comprises a plurality of positive emitter points for creating positive ions and a plurality of negative emitter points for creating negative ions, and
    wherein the plurality of positive emitter points and the plurality of negative emitter points are alternately positioned along the inner surface of the emitter ring.

3. The ionizer module according to claim 2, wherein the number of positive emitter points equals the number of negative emitter points.

4. The ionizer module according to claim 1, further comprising an airflow sensor coupled to the inlet nozzle and configured to measure a flow rate of a stream of air being supplied into the shell.

5. The ionizer module according to claim 1, further comprising an ion sensor arranged at the second end of the shell and configured to sample an ionic rate of the ionized stream of air being supplied to the hard drive.

6. The ionizer module according to claim 5, wherein the ion sensor comprises a metal grid through which the ionized stream of air flows, wherein the ionic rate of the ionized stream of air is sampled by measuring an electrical potential of the metal grid.

7. A hard drive particle cleaning system, comprising:
    an air source;
    an ionizer module coupled to the air source via upstream tubing, wherein the ionizer module comprises:
        a shell;
        an inlet nozzle arranged in a first end of the shell and coupled to the upstream tubing for supplying a stream of air from the air source into the shell;
        an emitter ring mounted on an inner surface of the shell, the emitter ring comprising a plurality of emitter points positioned along an inner surface of the emitter ring, wherein the emitter ring is configured to be coupled to a power source for ionizing the stream of air in the shell;
        a diffuser arranged on the inner surface of the shell between the first end of the shell and the emitter ring, wherein the diffuser is configured to provide an even flow of the stream of air across the plurality of emitter points; and
        an outlet nozzle arranged in a second end of the shell opposite the first end of the shell and coupled to downstream tubing;
    a mechanical shock system configured to secure a hard drive and apply a mechanical shock to the hard drive to dislodge particles inside the hard drive; and
    an exhaust system,
    wherein the downstream tubing is configured to be detachably coupled to a first opening in the hard drive for supplying the ionized stream of air into the hard drive and the exhaust system is configured to be detachably coupled to a second opening in the hard drive for exhausting the ionized stream of air and dislodged particles from inside the hard drive.

8. The hard drive particle cleaning system according to claim 7, wherein the plurality of emitter points comprises a plurality of positive emitter points for creating positive ions and a plurality of negative emitter points for creating negative ions, and
    wherein the plurality of positive emitter points and the plurality of negative emitter points are alternately positioned along the inner surface of the emitter ring.

9. The hard drive particle cleaning system according to claim 8, wherein the number of positive emitter points equals the number of negative emitter points.

10. The hard drive particle cleaning system according to claim 7, further comprising:
    an airflow sensor coupled to the inlet nozzle and configured to measure a flow rate of a stream of air being supplied into the shell; and
    a controller configured to control the power supplied by the power source to the emitter ring based on the flow rate measured by the airflow sensor.

11. The hard drive particle cleaning system according to claim 7, further comprising:
    an ion sensor arranged at the second end of the shell and configured to sample an ionic rate of the ionized stream of air being supplied to the hard drive; and
    a controller configured to control the power supplied by the power source to the emitter ring based on the ionic rate sampled by the ion sensor.

12. The hard drive particle cleaning system according to claim 11, wherein the ion sensor comprises a metal grid through which the ionized stream of air flows, wherein the ionic rate of the ionized stream of air is sampled by measuring an electrical potential of the metal grid.

13. The hard drive particle cleaning system according to claim 7, wherein the upstream tubing comprises a static dissipative material.

14. The hard drive particle cleaning system according to claim 7, wherein the downstream tubing comprises an insulative material.

15. The hard drive particle cleaning system according to claim 7, further comprising a conveyor system for sequentially positioning a plurality of hard drives within the hard drive particle cleaning system to be detachably coupled to the downstream tubing and the exhaust system and to receive the mechanical shock.

16. A method for dislodging and removing particles from a hard drive, the method comprising:
- coupling a hard drive to a mechanical shock system;
- coupling an ionizer module to a first opening of the hard drive via downstream tubing;
- coupling an exhaust system to a second opening of the hard drive;
- supplying an ionized stream of air from the ionizer module into the hard drive via the downstream tubing;
- applying a mechanical shock to the hard drive with the mechanical shock system to dislodge particles inside the hard drive; and
- exhausting the ionized stream of air and dislodged particles from inside the hard drive via the exhaust system.

17. The method according to claim 16, further comprising:
- measuring a flow rate of a stream of air supplied to the ionizer module; and
- controlling a power source coupled to the ionizer module to ionize the stream of air based on the measured flow rate.

18. The method according to claim 16, further comprising:
- sampling an ionic rate of the ionized stream of air supplied to the hard drive; and
- controlling a power supplied to the ionizer module to ionize a stream of air supplied to the ionizer module based on the sampled ionic rate.

19. The method according to claim 18, wherein monitoring the ionic rate of the ionized stream of air comprises measuring an electrical potential of a metal grid arranged in the ionizer module, wherein the ionized stream of air flows through the metal grid.

20. The method according to claim 16, further comprising:
- sequentially securing a plurality of hard drives to the mechanical shock system; and
- for each of the plurality of hard drives:
  - coupling the ionizer module to the first opening of the hard drive via downstream tubing;
  - coupling the exhaust system to the second opening of the hard drive;
  - supplying an ionized stream of air from the ionizer module into the hard drive via the downstream tubing;
  - applying a mechanical shock to the hard drive with the mechanical shock system to dislodge particles inside the hard drive; and
- exhausting the ionized stream of air and dislodged particles from inside the hard drive via the exhaust system.

\* \* \* \* \*